United States Patent
Natari

(10) Patent No.: US 10,467,121 B2
(45) Date of Patent: Nov. 5, 2019

(54) SMART TOOL FOR ENTERPRISE-WIDE SOFTWARE INTEGRATION AND DEPLOYMENT

(71) Applicant: Bank of America Corporation, Charlotte, NC (US)

(72) Inventor: Venkata R. Natari, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/887,562

(22) Filed: Feb. 2, 2018

(65) Prior Publication Data
US 2019/0243742 A1 Aug. 8, 2019

(51) Int. Cl.
G06F 11/36 (2006.01)
G06F 8/77 (2018.01)
G06F 8/71 (2018.01)
G06F 8/60 (2018.01)

(52) U.S. Cl.
CPC ............ G06F 11/3608 (2013.01); G06F 8/60 (2013.01); G06F 8/71 (2013.01); G06F 8/77 (2013.01); G06F 11/3688 (2013.01)

(58) Field of Classification Search
CPC .......... G06F 11/3608; G06F 8/60; G06F 8/71; G06F 8/77; G06F 11/3688
USPC ....................................................... 717/126
See application file for complete search history.

(56) References Cited

U.S. PATENT DOCUMENTS

| | | | |
|---|---|---|---|
| 4,558,413 A | 12/1985 | Schmidt et al. | |
| 4,912,637 A | 3/1990 | Sheedy et al. | |
| 5,649,200 A | 7/1997 | Leblang et al. | |
| 5,675,802 A | 10/1997 | Allen et al. | |
| 5,845,128 A | 12/1998 | Noble et al. | |
| 5,903,897 A | 5/1999 | Carrier, III et al. | |
| 6,073,214 A | 6/2000 | Fawcett | |
| 6,094,679 A | 7/2000 | Teng et al. | |
| 6,223,343 B1 | 4/2001 | Hopwood et al. | |
| 6,385,768 B1 | 5/2002 | Ziebell | |
| 7,069,541 B2 | 6/2006 | Dougherty et al. | |

(Continued)

OTHER PUBLICATIONS

StackOverflow, "How do you generate release notes?", 2009, published at https://stackoverflow.com/questions/1408584/how-do-you-generate-release-notes (Year: 2009).*

*Primary Examiner* — Hossain M Morshed
(74) *Attorney, Agent, or Firm* — Michael A. Springs; Moore & Van Allen PLLC; Nicholas C. Russell

(57) ABSTRACT

Embodiments of the present invention provide a system for executing a smart tool for enterprise-wide software integration and deployment. The system is typically configured for executing instruction in one or more modules of the smart tool to identify and gather one or more application prerequisites required for application development of an application, receiving a set of development codes from one or more users and storing the set of development codes in a first environment system, creating a package comprising at least one version of the set of development codes, deploying a packaged development code to a second environment system, performing a plurality of test on the packaged development code, in response to passing the plurality of tests, deploying the packaged development code to a real-time environment system.

20 Claims, 9 Drawing Sheets

(56) References Cited

U.S. PATENT DOCUMENTS

| | | | |
|---|---|---|---|
| 7,134,122 B1 | 11/2006 | Sero et al. | |
| 7,146,608 B1 | 12/2006 | Newman et al. | |
| 7,149,699 B2 * | 12/2006 | Barnard | G06Q 10/06 705/7.26 |
| 7,496,645 B2 | 2/2009 | Yeung et al. | |
| 7,680,932 B2 | 3/2010 | Defaix et al. | |
| 8,176,484 B2 | 5/2012 | Sero et al. | |
| 8,365,140 B2 | 1/2013 | Heyhoe et al. | |
| 8,438,562 B2 | 5/2013 | Sero et al. | |
| 8,677,315 B1 | 3/2014 | Anderson et al. | |
| 8,813,067 B2 | 8/2014 | Sero et al. | |
| 9,141,382 B2 | 9/2015 | Heyhoe et al. | |
| 9,286,187 B2 | 3/2016 | Brucker et al. | |
| 9,606,903 B2 | 3/2017 | Murugesan | |
| 9,658,833 B2 | 5/2017 | Heyhoe et al. | |
| 10,114,637 B1 * | 10/2018 | Willson | G06F 8/71 |
| 2004/0060044 A1 * | 3/2004 | Das | G06F 8/65 717/171 |
| 2004/0261053 A1 * | 12/2004 | Dougherty | G06F 8/20 717/101 |
| 2006/0271341 A1 | 11/2006 | Brown et al. | |
| 2009/0019420 A1 * | 1/2009 | Johnson | G06F 8/36 717/101 |
| 2009/0300580 A1 * | 12/2009 | Heyhoe | G06F 8/71 717/106 |
| 2010/0131939 A1 * | 5/2010 | Hieb | G06F 8/73 717/169 |
| 2010/0257151 A1 | 10/2010 | Lohman et al. | |
| 2010/0299327 A1 | 11/2010 | Kiefer et al. | |
| 2010/0299663 A1 | 11/2010 | Weissman et al. | |
| 2010/0318969 A1 | 12/2010 | Petrovicky et al. | |
| 2015/0100940 A1 | 4/2015 | Mockus et al. | |
| 2015/0293834 A1 | 10/2015 | Potdar | |
| 2016/0292066 A1 | 10/2016 | Stevens et al. | |
| 2016/0378434 A1 * | 12/2016 | Martick | G06F 8/10 717/101 |
| 2017/0093910 A1 | 3/2017 | Gukal et al. | |
| 2017/0124617 A1 | 5/2017 | Spoelstra et al. | |
| 2017/0249644 A1 | 8/2017 | DiMaggio et al. | |
| 2017/0372247 A1 * | 12/2017 | Tauber | G06F 8/71 |
| 2018/0025011 A1 | 1/2018 | Aksionkin et al. | |
| 2018/0275986 A1 | 9/2018 | Ghosh et al. | |

\* cited by examiner

SMART TOOL FOR ENTERPRISE-WIDE SOFTWARE INTEGRATION AND DEPLOYMENT

FIELD

The present invention relates to enterprise-wide continuous integration and continuous deployment of application software.

BACKGROUND

Continuous delivery and continuous integration of application software can be a difficult and time consuming process. Coordinating with a plurality of users and using multiple applications for integrating and deploying the application software decreases the efficiency and consumes more amount of time. Thus, there exists a need for a system which integrates and deploys the application software efficiently.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for continuous integration and continuous deployment of application software. The system embodiments may comprise one or more memory devices; a smart tool stored in the one or more memory devices, the smart tool comprising one or more modules, wherein the one or more modules include at least a planning module, development module, a build and deploy module, a testing module, and a release module, wherein the one or more modules comprise instructions executable by one or more processing devices operatively coupled to the one or more memory devices, wherein the one or more processing devices are configured for: executing instructions in the planning module to identify one or more application prerequisites required for application development of an application; and gather the one or more application prerequisites required for the application development of the application; executing instructions in the development module to: receive a set of development codes from one or more users, wherein each of the set of development codes is associated with a rule-set, wherein the rule-set defines a desired feature set for the associated development code; store the set of development codes in a first environment system; perform a first unit test on each of the set of development codes stored in the first environment system; and verify that each of the set of development codes stored in the first environment system meets a set of standards; executing instructions in the build and deploy module to: create a package comprising at least one version of each of the set of development codes stored in the first environment system, thereby resulting in a packaged development code; automatically deploy the packaged development code from the first environment system to at least one second environment system; restart the application associated with the packaged development code; perform a plurality of diagnostic checks associated with the packaged development code; executing instructions in the testing module to: perform a plurality of tests on the packaged development code deployed to the at least one second environment system; executing instructions in the release module to: verify that the packaged development code has passed the plurality of tests; in response to verifying, deploy the packaged development code to a third environment system.

In some embodiments, the planning module further comprises instructions for: initiating framework onboarding process, wherein the framework onboarding process comprises creating framework candidates; initiating application onboarding process, wherein the application onboarding process comprises calculating and reserving version range for release candidates and iteration candidates, wherein the iteration candidates comprise the set of development codes and the release candidates comprise the packaged development codes associated with the iteration candidates.

In some embodiments, the application onboarding further comprises creating a program increment development branch and opening a first iteration candidate of the iteration candidates under the program increment development branch, wherein the first iteration is assigned a version number from the version range associated with the iteration candidates; and creating a release development branch and opening a first release candidate under the release development branch, wherein the first release candidate is assigned the version number from the version range associated with the release candidates.

In some embodiments, the build and deploy module further comprises instructions for generating one or more notifications in response to deploying the package from the first environment system to at least one second environment system and transmitting the one or more notifications to a plurality of users.

In some embodiments, performing the plurality of tests on the packaged development code comprises performing second unit test on the packaged development code deployed to the at least one second environment system, performing a regression test on the packaged development code; performing a performance test on the packaged development code; and performing a user acceptance test on the packaged development code.

In some embodiments, performing the plurality of diagnostic tests comprises: performing a rule diagnostic check to verify that the packaged development code deployed to the at least one second environment system meets version requirements of the at least one second environment system; and performing an integration diagnostic check to verify that one or more connections with a plurality of systems are active.

In some embodiments, the build and deploy module further comprises instructions for creating release notes.

In some embodiments, the release module further comprises instructions for: validating the application in response to deploying the packaged development code to the third environment system; determining that the validation of the application is successful; and restarting the application associated with the packaged development code based on determining that the validation of the packaged development code is successful.

In some embodiments, the release module further comprises instructions for determining that the validation of the application is unsuccessful; and rolling back the packaged development code deployed to the third environment system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
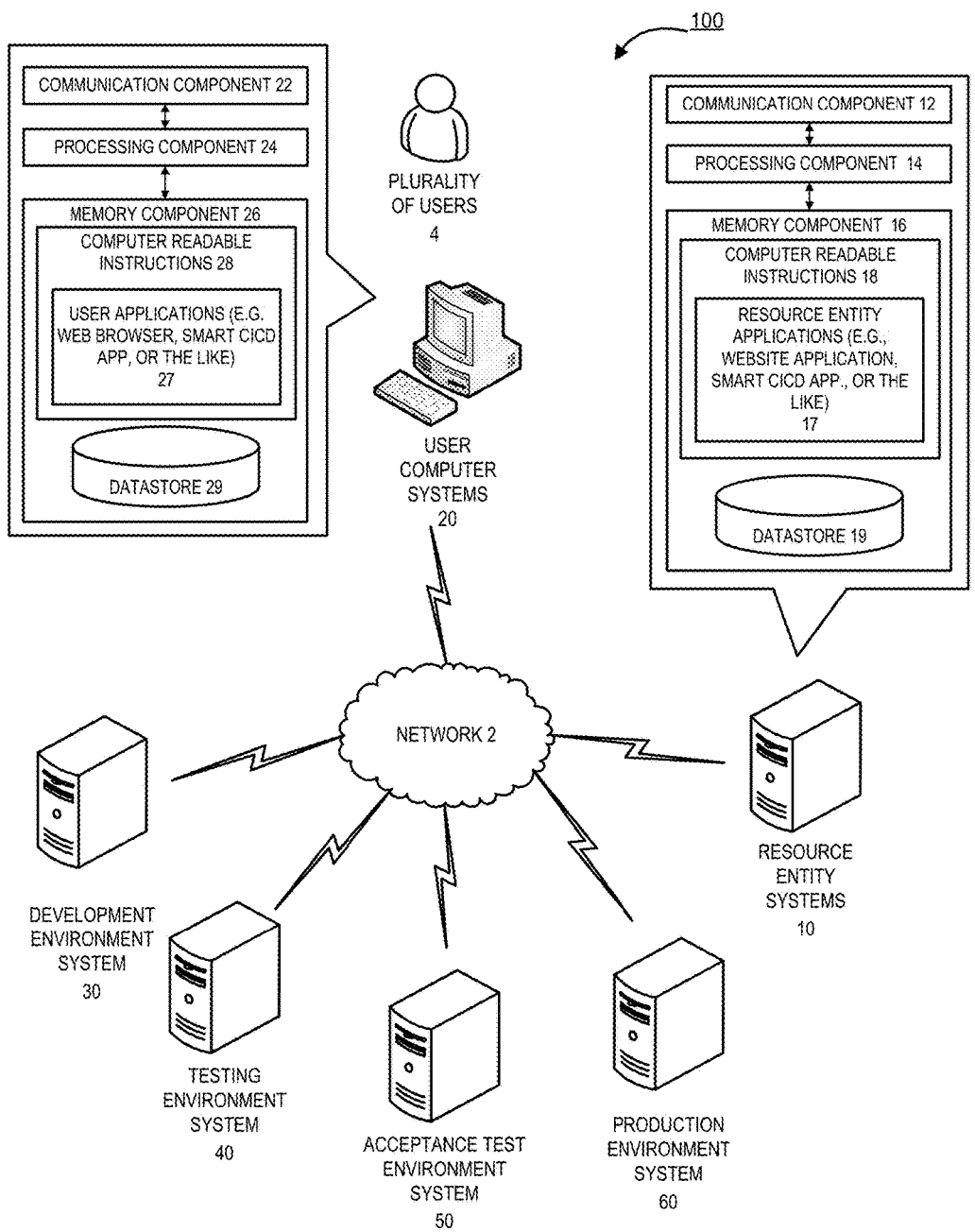

Having thus described embodiments of the invention in general terms, reference will now be made to the accompanying drawings, where:

FIG. 1 illustrates a block diagram illustrating a system environment for providing a smart tool for continuous integration and continuous deployment of application software, in accordance with embodiments of the present invention.

Figure 2:
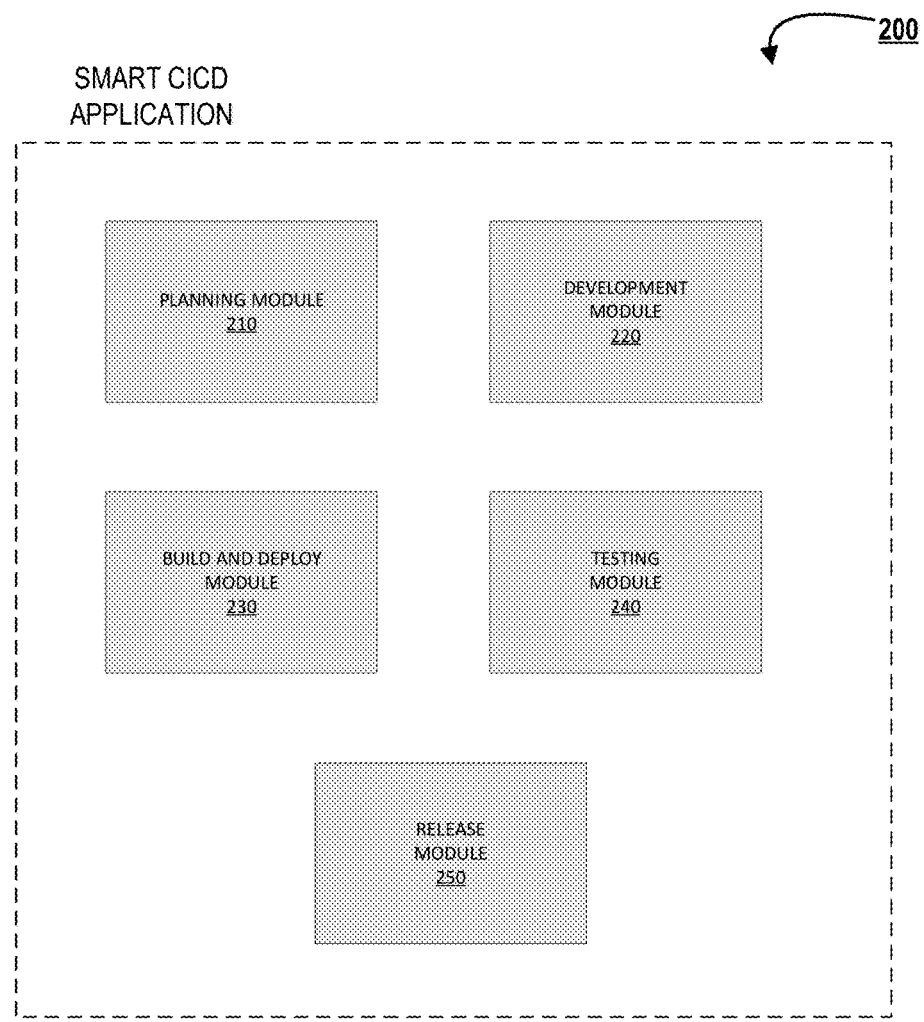

FIG. 2 illustrates a block diagram for smart tool application with one or more modules, in accordance with embodiments of the present invention.

Figure 3A:
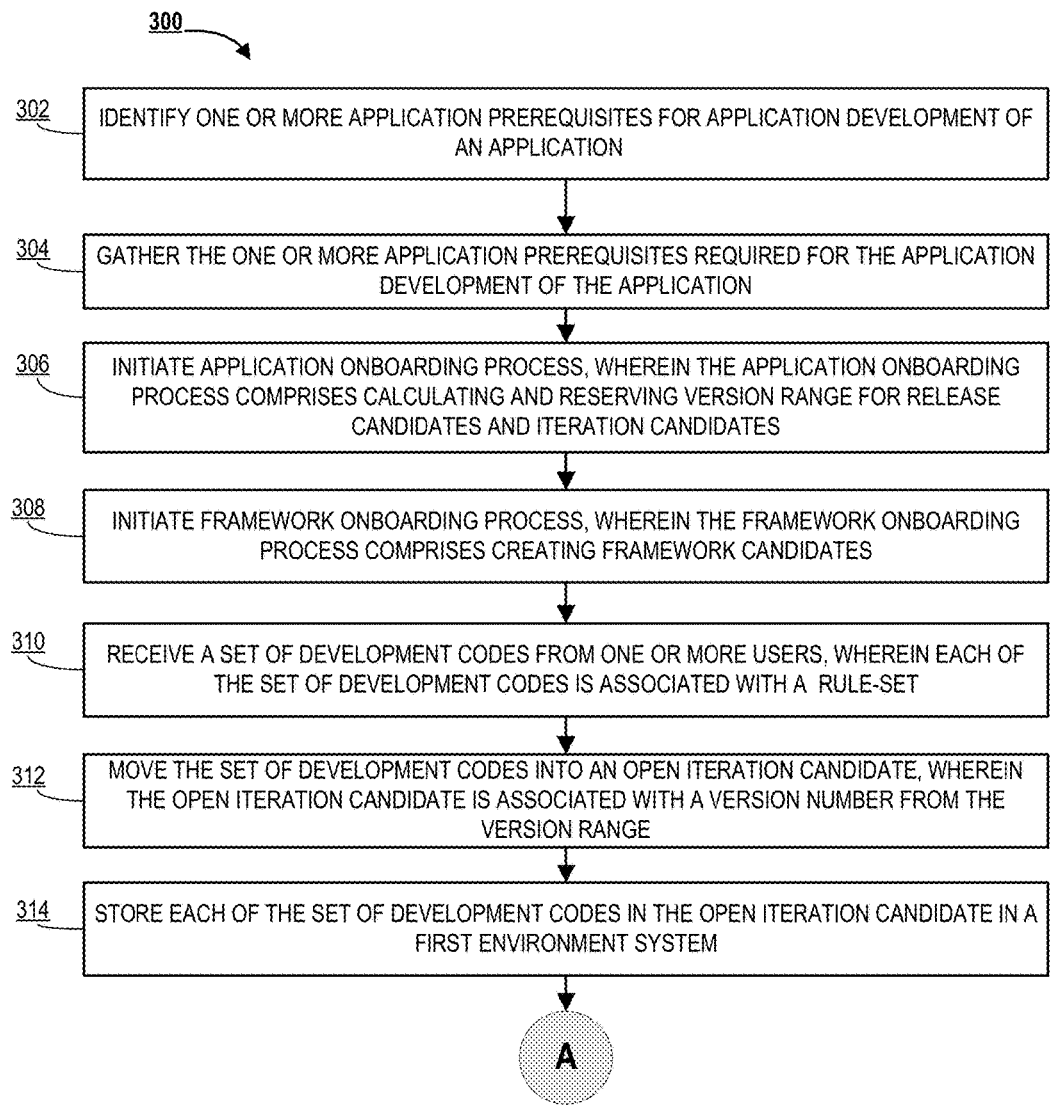

FIG. 3A is a flowchart illustrating a general process flow for automatically integrating and deploying the application software, in accordance with embodiments of the present invention.

Figure 3B:
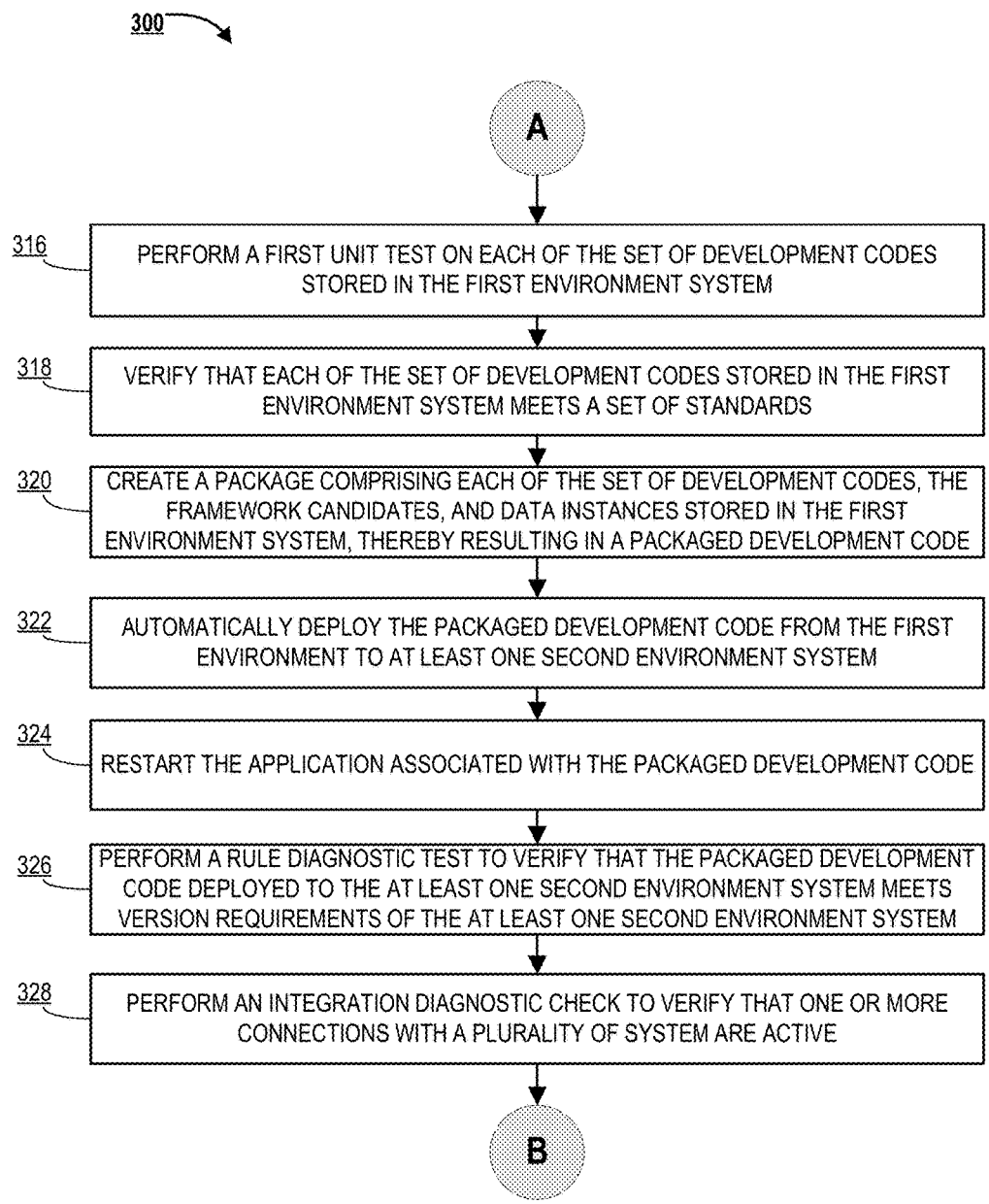

FIG. 3B is a flowchart illustrating a continuation of the general process flow for automatically integrating and deploying the application software, in accordance with embodiments of the present invention.

Figure 3C:
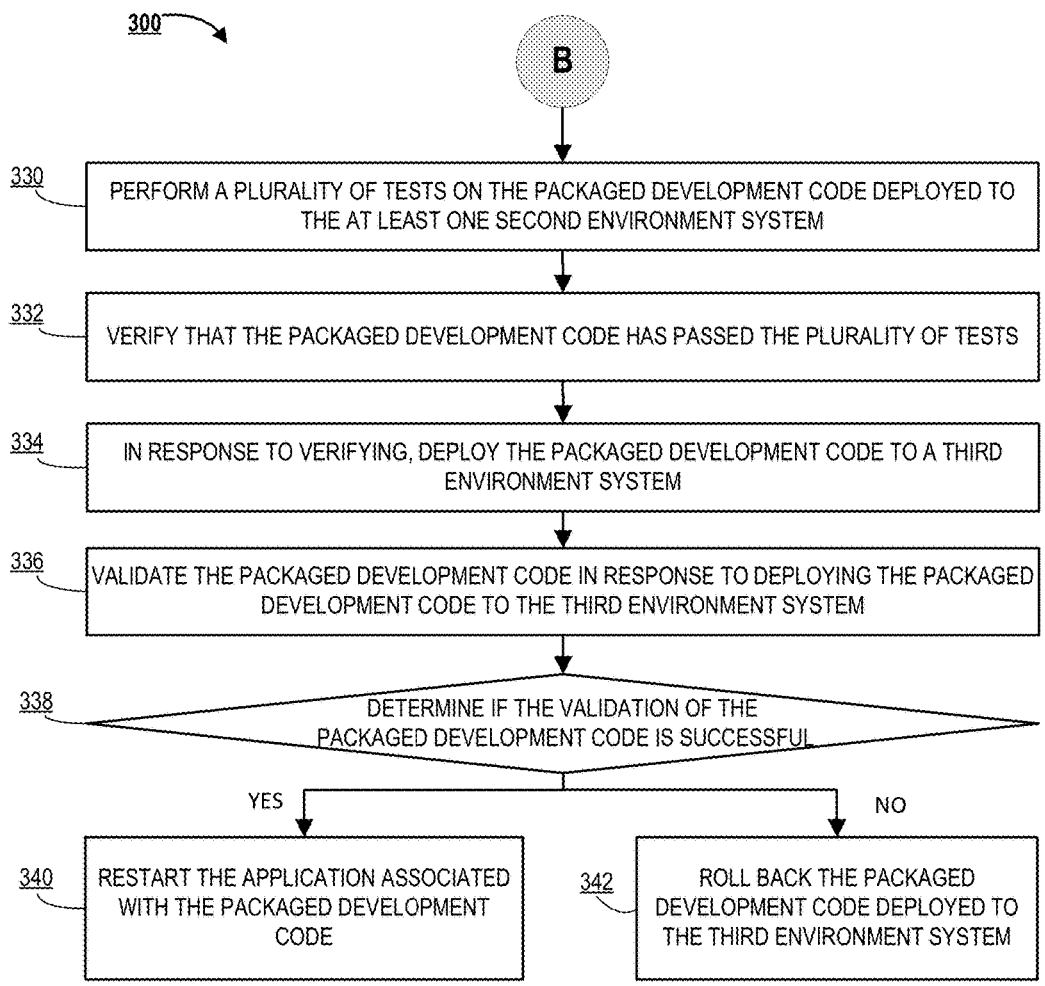

FIG. 3C is a flowchart illustrating a continuation of the general process flow for automatically integrating and deploying the application software, in accordance with embodiments of the present invention.

Figure 4:
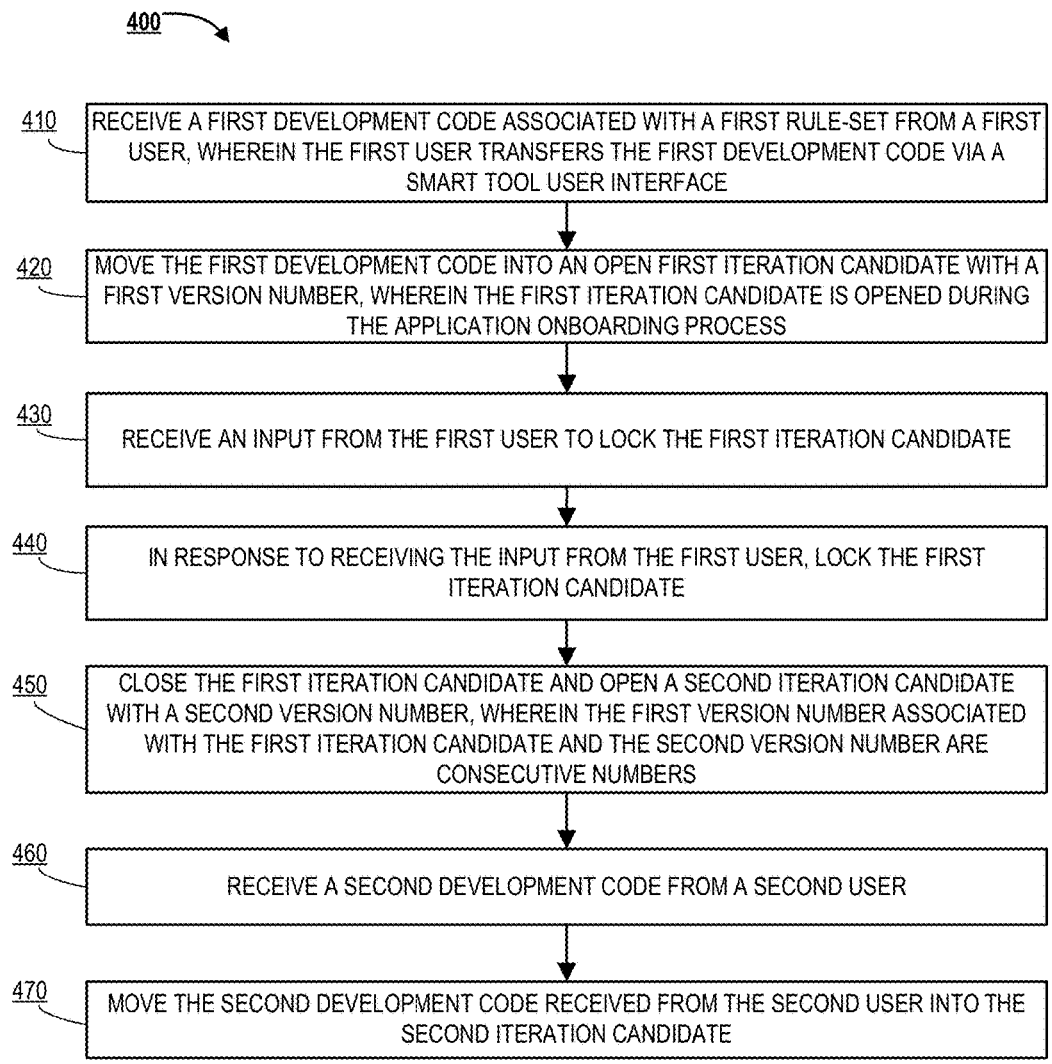

FIG. 4 is a flowchart illustrating a general process flow for ruleset versioning and creation of iteration candidates and release candidates, in accordance with embodiments of the present invention.

Figure 5:
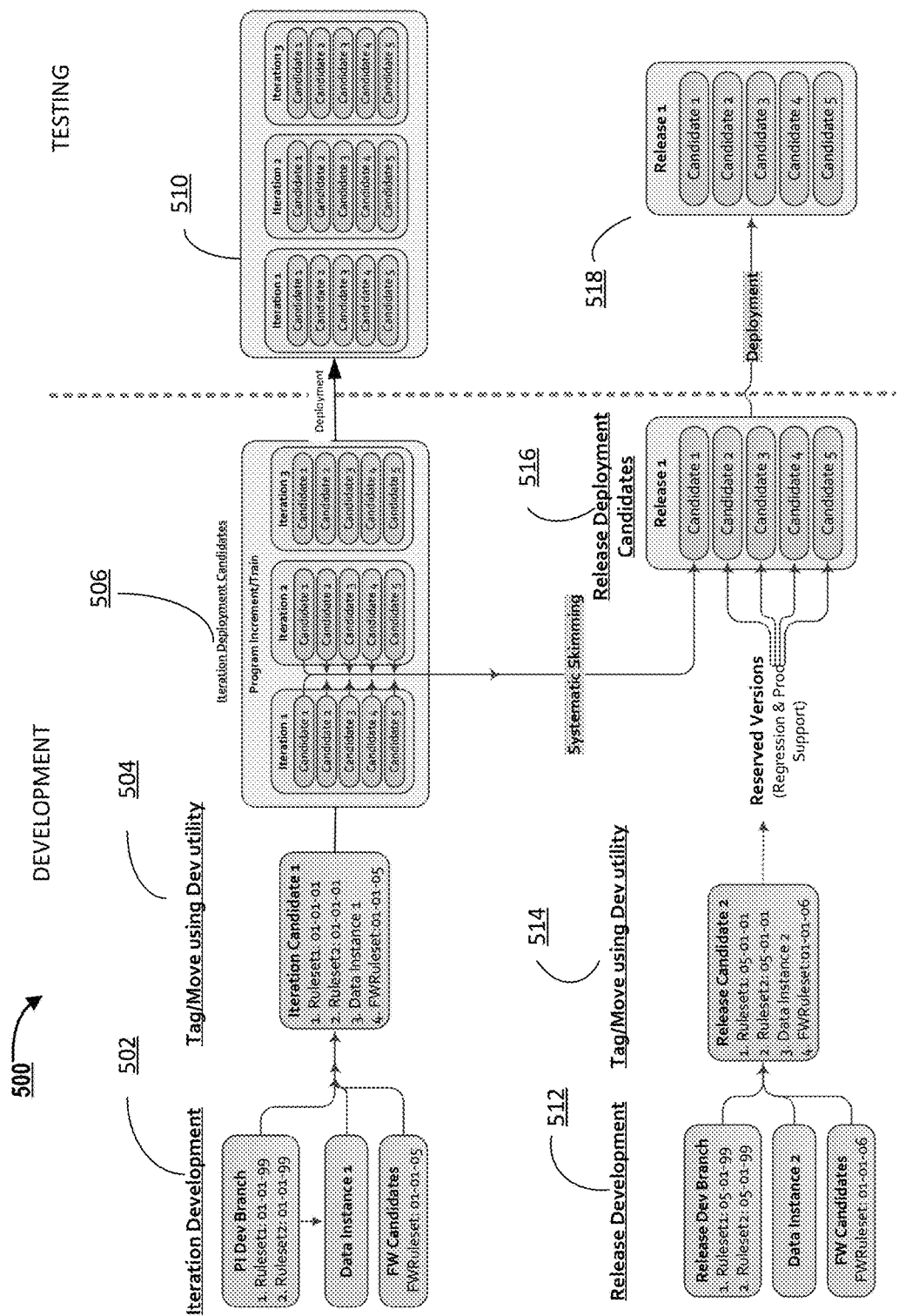

FIG. 5 is a block diagram illustrating the process of deployment of application software, in accordance with embodiments of the present invention.

Figure 6:
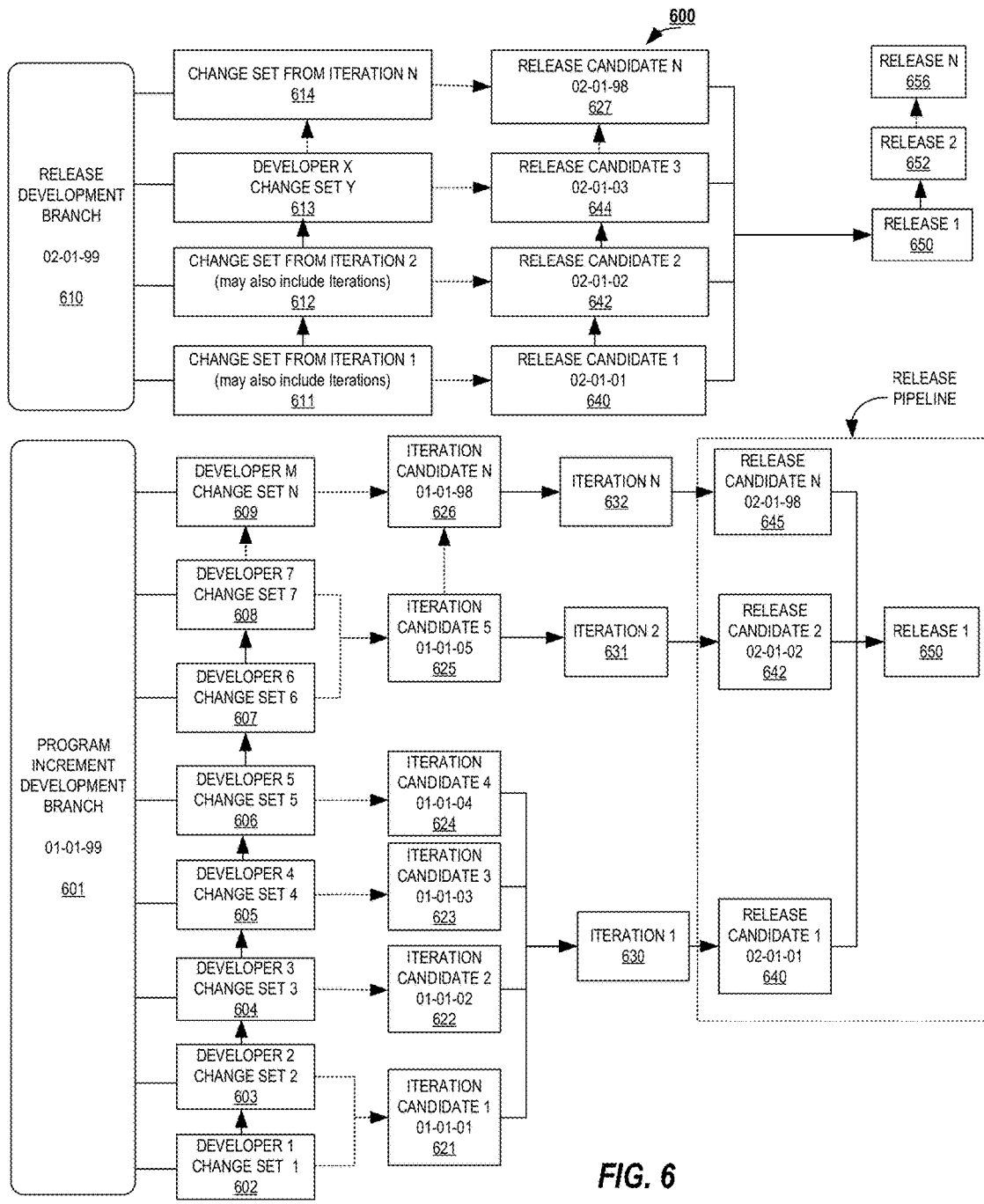

FIG. 6 is a block diagram illustrating the ruleset versioning and moving the development codes received from the user into iteration candidates and release candidates based on the duration of the iteration cycles and the release cycles, in accordance with embodiments of the present invention.

Figure 7:
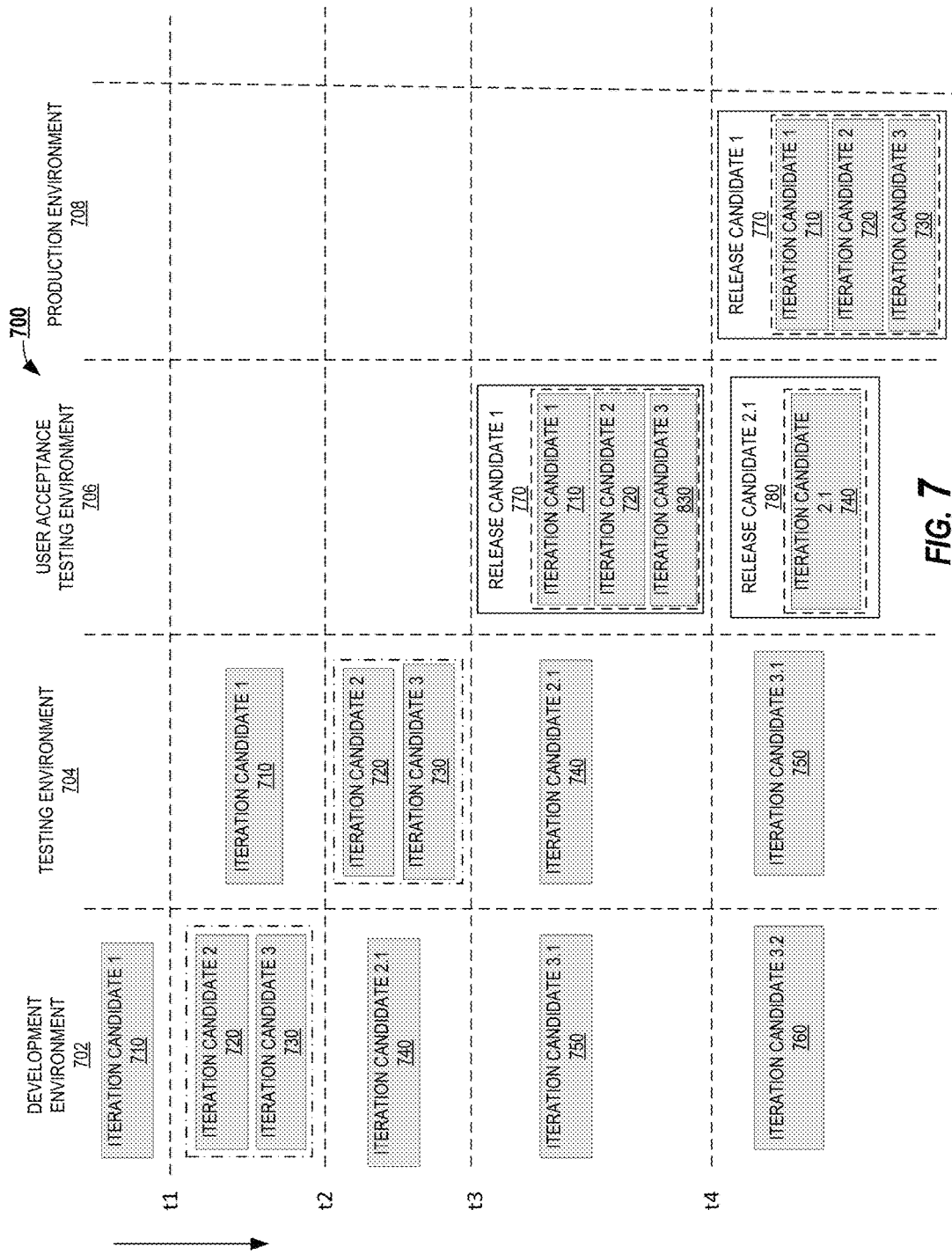

FIG. 7 is a block diagram illustrating the orchestration of the software integration and deployment process in one or more environment systems by the smart tool, in accordance with embodiments of the present invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Today there are many steps application developers must complete to deploy certain software within an entity. There is a need for developing and deploying a framework for automating and simplifying the process. An example of such frameweork is the Pega® Platform, which is provided by Pegasystems Inc. of Boston, Mass. It provides for an adaptive, cloud-architected software that empowers people to rapidly deploy, and easily extend and change application to meet strategic business needs, providing capabilities in content and resource management and business process management. This framework functions to automate the workflow of tasks, building and delivering application software.

Systems, methods, and computer program products are herein disclosed that provide for integrating and deploying one or more development codes associated with application software. Typically, conventional process for integrating and deploying the one or more development codes is performed by a number of teams comprising one or more users by transferring the one or more development codes to and fro between different applications. For example, the present systems may use one application for controlling versions of the one or more development codes and may use a different application for packaging the one or more development codes. Typically a user transfers the code to and fro between different applications. Such process is prone to human errors and each of the different applications may not perform properly all the time, thereby delaying the process of integration and deployment of the application software and decreasing the efficiency of the system. Therefore, there exists a need for a system which provides end to end integration and deployment of the application software.

The present system provides a smart tool or smart Continuous Integration and Continuous Deployment (CICD) application which is responsible for integrating and deploying the one or more development codes. The present system eliminates the need for transfer of the one or more development codes between multiple users and multiple applications and provides a unified solution to perform integration and deployment of multiple software applications in parallel. One or more modules of the smart CICD application comprise instructions for performing various steps in different phases of development of application software i.e., planning, development, build and deploy, testing, and release. Smart CICD application is built utilizing the features of a framework for deploying software (e.g., Pega® platform) and provides an end to end solution including gathering application prerequisites, controlling version of one or more development codes received from one or more users, packaging and deploying the one or more development codes, testing of the packaged development code, and deploying the packaged development codes to real-time environment making the application software available for end users. Moreover, the present system ensures timely delivery of the application software to the end user without any delays, thereby increasing the efficiency of the system.

In accordance with embodiments of the invention, the terms "resource entity system" may include any organization that is involved in development of application software. In some embodiments, the resource entity system may be any organization that implements operations or process management application development. In an exemplary embodiment, the resource entity system may be an organization that processes financial transactions including, but not limited to, banks, credit unions, savings and loan associations, card associations, settlement associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 illustrates enterprise-wide software integration and deployment system environment 100, in accordance with embodiments of the invention. As illustrated in FIG. 1, one or more resource entity systems 10 are operatively coupled, via a network 2, to user computer systems 20, a development environment system 30, a testing environment system 40, an acceptance test environment 50, production environment system 60, one or more server systems (not shown), and/or one or more other systems (not illustrated). In this way, the user 4 (e.g., one or more associates, employees, agents, contractors, sub-contractors, third-party representatives, customers, or the like), through a user application 27 (e.g., web browser, dedicated or smart Continuous Integration and Continuous Deployment (CICD) application, or the like), may access resource entity applications 17 (e.g., website, smart Continuous Integration and Continuous Deployment (CICD) application, or the like) of the resource entity systems 10 to submit one or more development codes associated with application development to the resource entity systems 10. In some embodiments, the smart CICD application or tool may be a part of an independent smart Continuous Integration and Continuous Deployment (CICD) system. In such an embodiment, the smart Continuous Integration and Continuous Deployment (CICD) system is maintained and operated by the resource entity systems 10. The smart Continuous Integration and Continuous Deployment (CICD) system may comprise one or more processing devices operatively coupled to the one or more memory devices and configured to execute computer readable code stored in the one or more memory devices.

In some embodiments, the development environment system 30, the testing environment system 40, the acceptance test environment system 50, and the production environment system 60 may be a part of the resource entity systems 10. The development environment system 30, the testing environment system 40, the acceptance test environment system 50, and the production environment system 60 may comprise one or more processing devices operatively coupled to the one or more memory devices and configured to execute computer readable code stored in the one or more memory devices. In some embodiments, the development environment system 30, the testing environment system 40, the acceptance test environment system 50, and the production environment system 60 may be a part of single environment system, wherein the single environment system may be maintained by the resource entity systems 10.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the development environment system 30, the testing environment system 40, the acceptance test environment system 50, and the production environment system 60, and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., website application, smart CICD application, or the like). In some embodiments, the one or more memory components 16 include one or more data stores 19 for storing data related to the resource entity systems 10, including, but not limited to, data created, accessed, and/or used by the resource entity application 17. The smart CICD application may include one or more modules, wherein the one or more modules comprise instructions executable by the one or more processing components 14. The development environment system 30, the testing environment system 40, the acceptance test environment system 50, and the production environment system 60 may include one or more memory components, wherein the one or more memory components may include one or more development codes associated with the application development.

As illustrated in FIG. 1, plurality of users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26. The plurality of users may be any employees of the resource entity system. For example, the plurality of users may be application program developers, business analysts, and/or the like. In addition, the system environment 100 may also include user computer systems of one or more end users, wherein the one or more end users access the application software deployed by the system on the user computer systems.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the other user computer systems, the development environment system 30, the testing environment system 40, the acceptance test environment system 50, and the production environment system 60, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with a user of the plurality of users 4. In one embodiment of the present invention, the smart CICD application in the user computer systems 20 may comprises a smart tool user interface to display information associated with the application development.

As illustrated in FIG. 1, the user computer systems 20 may have computer-readable instructions 28 stored in the one or more memory components 26, which in one embodiment includes the computer-readable instructions 28 for user applications 27, such as smart CICD application (e.g., apps, applet, or the like), a web browser or other apps that allow the user to take various actions, including allowing the user to access applications located on other systems, or the like. In some embodiments, the user utilizes the user applications 27, through the user computer systems 20, to access the resource entity applications 17 to submit one or more development codes associated with the application development. Moreover, in some embodiments the user may also utilize the user applications 27 to check the status of the application development.

Referring now to FIG. 2, a block diagram 200 is provided for smart CICD application. The smart CICD application described herein may utilize one or more features of the enterprise software such as Pega® to facilitate continuous integration and continuous development of the application software. As shown in FIG. 2, the smart CICD application comprises one or more modules, wherein the one or more modules may include a planning module 210, a development module 220, a build and deploy module 230, a testing module 240, a release module 250 and/or the like. Each of the one or more modules include one or more instructions that can be executed by one or more processors. In some embodiments, the planning module 210, the development module 220, the build and deploy module 230, the testing module 240, the release module 250 may be separate modules. In some other embodiments, the planning module 210, the development module 220, the build and deploy module 230, the testing module 240, the release module 250 may be part of a unified single module. In some embodiments, any of the planning module 210, the development module 220, the build and deploy module 230, the testing module 240, or the release module 250 may be combined into one single module. For example, the testing module 240 and the release module 250 may be combined into one module. In some other embodiments, the planning module 210, the development module 220, the build and deploy module 230, the testing module 240, or the release module 250 may have overlapping instructions described in the process flows 300 and 400.

The planning module 210 of the smart CICD application includes one or more instructions for release planning. The release planning may be release or delivery of application software or incremental release or incremental delivery of the application software to one or more end users. Release of the application software may be performed in different cycles. In some embodiments, duration of each release cycle may be twelve months. In alternate embodiments, the duration of each release cycle may be more or less than twelve months. Each release cycle may include one or more iterations. For example, the release cycle of the application software may include twenty features that need to be delivered to the one or more end users at the end of the release cycle and each iteration of the release cycle may include one feature of the twelve features. In another example, each iteration may include more than one feature. In some embodiments, duration of each iteration may be one week. In alternate embodiments, the duration of each iteration is more or less than one week. Each iteration may have multiple iteration candidates as illustrated in FIG. 5, wherein each of the iteration candidates may include one or more development codes associated with rulesets, data instances, and framework candidates. The planning module comprises instructions for framework onboarding and application onboarding which include creation of development branches and setting version ranges for release candidates and iteration candidates. In some embodiments, creation of version ranges is based on user input which comprises number of release cycles, number of iteration cycles, duration of each release cycle, duration of each iteration cycle, number of technical features, and/or the like. Upon receiving the user input, the system reserves version ranges for release candidates associated with release cycles and iteration candidates associated with iteration cycles. In some embodiments, the system automatically assigns version ranges based on a previous history of releases associated with the application software. In some embodiments, the planning module may create development branches for program increments and release development as illustrated in FIG. 6.

Instructions for release planning may include gathering one or more requirements from a plurality of users. The plurality of users may be employees of the resource entity or third parties. For example, the system may gather the one or more requirements from business analysts and/or the like. In some embodiments, the planning module 210 may comprise instructions for gathering technical requirements from the plurality of users associated with a first release. For example, the system via a smart tool user interface, may prompt the plurality of users to input one or more features or functions to be included in the application software for the first release. The technical requirements or features or functions may be grouped to form one or more rule-sets. The rule-sets are used by the plurality of users to develop the code of the application software. For example, one or more application developers may develop the program code or the source code based on the rule-sets. In some embodiments, the planning module 210 may comprise instructions to set up environment required for the development of the application software. For example, if the development of the application software needs one or more platforms such as Java runtime environment, Python environment, and/or the like, the system may install the one or more platforms in the one or more environment systems shown in FIG. 1 and the user computer systems 20. In some embodiments, the planning module 210 may comprise instructions to identify application prerequisites. For example, the system may identify that connections are required to one or more external databases or servers for the application software development and may establish the connections. In another example, the system may identify that the application software development is dependent on some parts of development code of another application software and may download or copy the parts of the development code of another application software stored in the resource entity system or other open source third party system (not shown) into the one or more environment systems and the user computer system 20. In yet another example, the system may identify that the application software development is dependent on previous one or more development codes and frameworks associated with a previous iteration cycle or release cycle and may verify the availability of the previous one or more development codes, data instances, and framework candidates associated with the previous release cycle or iteration cycle. In such an example, if any of the previous one or more development codes, data instances, and framework candidates are missing from the user computer system 20 or the one or more environment systems, the system may download or copy the missing previous one or more development codes to the user computer system 20 and the one or more environment systems. In another example, the system may identify system configuration required for the application software and may notify a user. For example, if the development of application software needs system requirements such as 'n' gigabytes Random Access Memory and may notify the software developer involved in the development of the application software. In some embodiments, the planning module 210 may comprise instructions for creating release instructions. For example, the system may automatically set the release date and calculate the number of iterations needed with or without user input. In one embodiment, the planning module 210 may comprise instructions for notifying the plurality of users via the smart tool user interface about the status of the environment setup, identification of application prerequisites, and the creation of release instructions. For example, the system may notify the plurality of users that the environment set up is complete and that the application prerequisites exist in the one or more environment systems. The system may also notify the plurality of users about the one or more requirements, the release date, and the iteration end date.

The development module 220 may comprise instructions for controlling versions during the development phase of the application software development. Once the planning module 210 notifies the plurality of users, the plurality of users may develop the code. Each of the plurality of users may submit one or more development codes to the system and the system may save the one or more development codes in the development environment system 30 under different versions of iteration candidates and release candidates. The one or more development codes may be a part of a single unified development code associated with the application software. Each of the one or more development codes may include at least one technical features or technical functions. Controlling versions of the iteration candidates and release candidates is illustrated in FIG. 4 through FIG. 7. The development module 220 may comprise instructions for locking and unlocking versions of iteration candidates and release candidates. For example, the system may lock a version of the iteration candidate which comprises at least one development code submitted by a first user to prevent other users from making changes to the development code, wherein the locked development code is stable and without any errors. In one embodiment, the system may comprise instructions for performing unit testing on the one or more development codes submitted by the plurality of users based on instructions received from the plurality of users. Unit testing is an application software testing method using which the development code is tested to cover all possible cases in which the development code may fail. Additionally, the development module 220 may comprise instructions for controlling versions of framework candidates.

The build and deploy module 230 comprises instructions for packaging one or more development codes associated with an iteration cycle or a release cycle. For example, the one or more development codes associated with one or more technical features submitted by the plurality of users for a release cycle or iteration cycle are bundled or archived. Additionally, the build and deploy module may package framework candidates and data instances along with the one or more development codes. In some embodiments, the system may identify the most recent version of each of the one or more development codes and may package the most recent version of the one or more development codes. For example, the user submits a development code to the system and after moving the development code into an iteration candidate, the user may make a small change to the already submitted code stored in the iteration candidate as a new version or sub version of the already submitted development code. In some other embodiments, the system may identify all existing versions of each of the one or more development codes and may package all existing versions of each of the one or more development codes. In some other embodiments, the system may identify the most latest version of the development code in other environment systems such as the testing environment system 40, acceptance test environment system 50, production environment system 60 and may compare the most latest version in other environment systems with a most recent version in the development environment system. The system may then package all the missing versions of the one or more development codes. In one embodiment, the build and deploy module may comprise instructions for deploying the packaged development code to a second environment system, wherein the second environment system may be the testing environment system 40 or the acceptance test environment system 50. The packaged development code comprises one or more development codes, framework candidates, and data instances. In some embodiments, the testing environment system 40 and the user acceptance test environment system 50 may be a unified testing environment system. In one embodiment, the build and deploy module 230 comprises instructions for performing an integration diagnostic check to verify that one or more connections with a plurality of systems are active. For example, the smart CICD application may be communicating with the plurality of systems to perform one or more functions described herein. The system performs a diagnostic check to verify that the connections with the plurality of systems are active. In one example, the system performs the diagnostic check to verify database connections. In another example, the system may verify development code connections. In other words, the development code may be associated with another development code from a different application and the system may verify connections with the another development code. In some embodiments, the build and deploy module 230 comprises instructions for performing database deployment. In prior art systems, the database deployment process is a manual task, wherein a user performs the database deployment associated with the application which includes updating database tables such as creating or deleting database rows or columns. The present invention enables automatic database deployment associated with the application. In one embodiment, the build and deploy module 230 comprises instructions for preparing release notes. Release notes is a document comprising a list of all the technical features or technical functions included in the packaged development code, wherein the release notes may be sent to the one or more end users on the release cycle date or the iteration cycle date. In one embodiment, the build and deploy 230 comprises instructions for restarting the application associated with the development code of the application software. For example, an old version of the application may be running, the system after deploying the packaged development code may restart the application to run the application with new technical features included in the packaged development code. In one embodiment, the build and deploy 230 is configured to verify that the development code submitted by the plurality of users meets a set of standards. This step may be performed before packaging the one or more development codes or even before moving the development codes received form the one or more users into iteration candidates. For example, to maintain a unique coding standard throughout a resource entity, the resource entity system may place the set of standards. The system verifies that each of the one or more development codes meets the set of standards.

The testing module 240 comprises instructions to facilitate implementation of one or more tests on the packaged development code. Once the packaged development code is deployed to the testing environment system 40, the testing module 240 may be configured to facilitate implementation of unit testing, regression testing, and performance testing on the packaged development code. In some embodiments, the system may facilitate implementation of the one or more tests by a user. The user may be an application developer, an application test engineer, and/or the like. The user may manually implement the one or more tests and the system facilitates the testing process such as making testing scripts associated with the one or more tests available for the user, providing access to the packaged development code stored in the one or more environment systems, and/or the like. In alternate embodiments, the system may automatically execute scripts associated with the one or more tests to automatically perform testing on the packaged development code. In such an embodiment, the final testing process may be reviewed by a user. Automatic execution of the scripts may be associated with historical data related to the testing of packaged development codes associated with other similar application software. The historical data may be stored in data store 19 and/or data store 29. Regression testing is an application software testing method to verify that the application software still functions the same way after integration of the new technical functions in the packaged development code. Performance testing is an application software testing method to test the performance of the application software after integration of the new technical functions in the packaged development code. The testing module 240 also comprises instructions to facilitate implementation of a user acceptance test. The user acceptance test is an application software testing method to create production like scenarios or real-time scenarios and test the application software using the real-time scenarios to verify the functionality and the performance of the application software after the integration of the new technical functions in the packaged development code. In some embodiments of the present invention, wherein the testing environment system 40 and the acceptance test environment system 50 are separate systems, the system after deploying the packaged development code to the test environment system 40 facilitates implementation of the one or more tests on the packaged development code. After the packaged development code has passed the one or more tests, the system may deploy the packaged development code to the acceptance test environment system 50 to perform the user acceptance test on the packaged development code. In alternate embodiments of the present invention, wherein the testing environment system 40 and the acceptance test environment system 50 are a unified testing environment system, the build and deploy module 230 of the system deploys the packaged development code to the unified testing environment system. Upon deployment of the packaged development code to the unified testing environment system, the testing module 240 of the system may facilitate implementation of the one or more tests including the user acceptance test on the packaged development code.

Once the packaged development code has passed the one or more tests, the release module 250 comprises instructions to deploy the packaged development code to the production environment system 60. The production environment system 60 is the real time system where the application software is delivered to the one or more end users. The release module 250 comprises instructions for facilitating implementation of a smoke test on the packaged development code. Smoke test is an application software testing method to verify that main functionalities of the application software are functioning without any errors after integration of the new technical functions. The release module 250 comprises instructions for validation of the application software after deployment of the packaged development code to the production environment system 60. The release module 250 comprises instructions to roll back the packaged development code deployed to the production environment system when the smoke test or the validation is unsuccessful. For example, the system rolls back to the most stable version of the application software based on determining that the validation of the application software is unsuccessful after deployment of the packaged development code. The smart CICD application and the one or more modules of the smart CICD application may simultaneously deploy and integrate more than one packaged development codes associated with one or more software applications to multiple environment systems.

In some embodiments, the one or more modules of the smart CICD application implement some or all the instructions described in FIGS. 3A, 3B, and 3C by calling one or more functions or scripts stored in the data store 19 of the resource entity system. For example, regression test scripts may be stored in the resource entity system and the testing module (while performing the one or more tests including the regression test) may call the regression test scripts stored in the resource entity system. In some embodiments, the one or more modules of the smart CICD application may perform some or all the instructions described in FIGS. 3A, 3B, and 3C after receiving an input and/or in automatic response from a user. In one exemplary embodiment, the input may be an approval from a user associated with the resource entity to perform one or more instructions. For example, the smart CICD, in some embodiments may only deploy packaged development code to the one or more environment systems after receiving an approval from a manager and/or the like; whereas in other embodiments, the smart CICD application may automatically deploy packaged development code to the one or more environment systems. In various embodiments, the smart CICD application 200 may not include each of the other modules discussed herein. For example, the smart CICD application may not include the testing module 240. In such a configuration, when the process discussed herein reaches the appropriate stage, the smart CICD application 200 may send instructions to the testing module 240. The instructions may cause the testing module 240 to perform one or more of the tests discussed elsewhere herein such as a unit test or a regression test. In some embodiments, the testing module 240 may be stored and/or executed on a separate system than the smart CICD application 200, and in other embodiments, the testing module 240 may be stored and/or executed on the same system as the smart CICD application 200, but may be considered a separate application or module from the smart CICD application 200. In such a case, the testing module 240 may require an application call or instructions to be sent to the testing module 240 from the smart CICD application 200 for it to commence testing.

Referring now to FIG. 3, a general process flow 300 is provided for integration and deployment of application software. The smart CICD application of the system is capable of performing the steps in the process flow 300. As shown in block 302, the system identifies one or more application prerequisites for the application development of an application. Application perquisites may be one or more development codes, one or more databases, one or more other applications, system configurations and/or the like. As shown in block 304, the system gathers the one or more application prerequisites required for the application development. For example, the system may identify that the application software development is dependent on some parts of development code of another application software and may download or copy the parts of the development code of another application software into the one or more environment systems and the user computer system 20. In another example, the system may identify system configuration required for the application software and may notify a user.

As shown in block 306, the system initiates application onboarding process, wherein the application onboarding process comprises calculating and reserving version range for release candidates and iteration candidates. The version ranges of release candidates and iteration candidates are independent and do not conflict with each other. As explained previously, release or delivery of application software is performed in different release cycles. Each release cycle comprises multiple iterations or iteration cycles. Each release cycle comprises one or more release candidates and each iteration cycle comprises one or more iteration candidates. Iteration candidates of one or more iteration cycles are combined to form a release candidate. The system based on the duration of each iteration cycle and release cycle, calculates a number of release candidates required for each of the multiple release cycles and a number of iteration candidates required for each of the multiple iteration cycles. As such, the system determines the version ranges for release candidates and iteration candidates. Release candidates and iteration candidates are explained in detail in FIG. 5 through FIG. 7. The system, as part of the application onboarding process, may create a development branch for one or more rulesets, wherein the development branch is used to store one or more development codes associated with one or more rulesets. In some embodiments, the development branch may be used to develop one or more development codes temporarily before pushing or tagging the one or more development codes into the iteration candidates and release candidates. The system may reserve version ranges for release candidates and iteration candidates under the development branch and open an iteration candidate to receive one or more development codes from one or more users. For example, the system may open a development branch with a version range of '01-01-01' through '01-01-99' and then open an iteration candidate '01-01-01' to receive the one or more development codes. In one embodiment, the system creates a program increment development branch and a release development separately as illustrated in FIG. 6. The system maintains separate environment pipelines for program increment and release. The program increment branch is a development branch where program increment development branch is utilized by the one or more users to develop one or more development codes and move the development codes into iteration candidates associated with respective iteration cycles. Release development branch comprises release candidates with multiple iteration candidates associated with multiple iteration cycles as illustrated in FIG. 6, wherein the release candidates from release development branch are deployed into production environment.

As shown in block 308, the system initiates framework onboarding process, wherein the framework onboarding process comprises creating framework candidates. Creation of framework candidates include gathering application frameworks for a release cycle or an iteration cycle required for the development of application software. Application framework is a reusable program code that can be used by multiple applications and is not specific to any one application. For example, application framework may be a library which can be a collection of functions or objects, and/or the like. Each ruleset may comprise one or more framework candidates. In some embodiments, the system automatically creates framework candidates. In alternate embodiments, the system receives framework candidates from any of the plurality of users. In some embodiments, the framework candidates are created for every iteration candidate. In some embodiments, the framework candidates are created for every iteration cycle. In such an embodiment, a user from the plurality of users may create a framework candidate associated with an iteration cycle and may submit it to the system via the smart tool user interface. The system after receiving the framework candidate, may assign a framework version number and store it in the first environment system i.e., the development environment system 30. In some embodiments, the creation of framework candidates may be performed after or before creation of set of development codes by the plurality of users. In some embodiments, the framework candidates are created for every iteration candidate. In some embodiments, the system creates the framework candidates. In some embodiments, the system receives the framework candidates along with the development codes from a user.

Additionally, the system may also receive one or more data instances from the a user. Data instances are non-versioned data objects and may contain data at a particular instance. For example, data instances are values assigned to a database table at an instance. In some embodiments, these data instances may be utilized by the set of development codes associated with a rule-set to achieve one or more technical functions.

As shown in block 310, the system receives a set of development codes from one or more users, wherein each of the set of development codes is associated with a rule-set. Each ruleset is associated with one or more technical features to be included in the application. As shown in block 312, the system moves the set of development codes into an open iteration candidate, wherein the open iteration candidate is associated with a version number from the version range. In some embodiments, the system may move the set of development codes into the open iteration candidate only after receiving an input from the one or more users to move the set of development codes into the open iteration candidate. In alternate embodiments, the system automatically moves the set of development codes into the open iteration candidate as soon a user from the one or more users submits a development code from the set of development codes. In some embodiments, the framework candidates and data instances associated with each of the set of development codes are submitted by the user while submitting each of the set of development codes. In such an embodiment, the system moves the framework candidates and data instances associated with the each of the set of development codes into the open iteration candidate while moving the set of development codes.

As shown in block 314, the system stores each of the set of development codes in the open iteration candidate in the first environment system. The first environment system is the development environment system 30. For example, the system receives first code associated with two technical features from a first user and may move the first code from the development branch to store the first code in a first iteration candidate with a version number in the development environment system.

As shown in block 316, the system facilitates implementation of a first unit test on each of the set of development codes stored in the first environment system. This step may be performed before or after the steps described in block 312 and block 314. In other words, the system may facilitate implementation of a first unit test on each of the set of development codes before moving and storing the set of the development codes in open iteration candidate. The first unit test may be performed on each of the development codes received from the one or more users by a single user such as an application test engineer. Alternatively, the first unit test may be performed by the same user who submitted the development code (e.g., application developer). In some embodiments, the system monitors the first unit test on each of the development codes in the first environment system to identify failure of the first unit test on any of the development codes. In some embodiments, when any of first unit test cases associated with the first unit test fail, the system automatically notifies the user who submitted the development code to the system about the failed first unit test cases. In such an embodiment, the user may make changes to the development code and resubmit the development code to the system. In alternate embodiments, the system performs first unit test after storing each of the development codes in the iteration candidate. In such an embodiment, when any of test cases associated with the first unit test fail, the system notifies the user associated with the development code. Once the user resubmits the development code, the system may store the resubmitted development code in a new iteration candidate with a new version number, wherein the new version number is consecutive to the old version number. In some embodiments, the development code resubmitted by the user is stored in the same open iteration candidate. In some embodiments, after performing the first unit test on each of the set of developments codes stored in the iteration candidates, the system may send the set of development codes to a set of users for review. In such an embodiment, the set of users may review the set of development codes and submit an approval to the system.

As shown in block 318, the system verifies that each of the set of development codes stored in the first environment system meets a set of standards. This step may be performed before performing the first unit test on each of the set of development codes or before moving and storing the set of development codes in the iteration candidate. The set of standards may be rules or code development guidelines created by the resource entity system, wherein the set of standards ensure that the one or more development codes have same coding conventions. In one embodiment, wherein one development code submitted by a user does not meet the set of standards, the system notifies the user and the user resubmits the development code. In some embodiments, the system verifies that each of the development codes meets the set of standards before storing each of the development codes in the iteration candidate.

As shown in block 320, the system creates a package comprising each of the set of development codes, framework candidates, and data instances stored in the iteration candidate in the first environment system, thereby resulting in a packaged development code. The process of packaging of the development codes is discussed in detail in FIG. 6. The system packages the set of development codes, framework candidates, and data instances in multiple iteration candidates for multiple iteration cycles after receiving an input from a first user of the plurality of users. Upon packaging the set of development codes, framework candidates, and data instances, the system locks the associated iteration candidates in which the set of development codes, the framework candidates, and the data instances are stored.

As shown in block 322, the system automatically deploys the packaged development code from the first environment to at least one second environment system. The second environment system may be the testing environment system 40 or the acceptance test environment system. The system stores the packaged development code with the associated iteration candidate version number. The process described in block 310 through block 322 may be repeated for multiple iteration candidates in one iteration cycle. Similarly, the process may be repeated for multiple iteration cycles.

As shown in block 324, the system restarts the application software associated with the packaged development code. To reflect the changes associated with the packaged development code, the system restarts the already running application software in the at least one second environment system. However, in some embodiments, restart of the application software is not required to reflect the changes. In such an embodiment, the system intelligently identifies that the restart of the application software is not required based on the type of the packaged development code. As shown in block 326, the system performs a rule diagnostic test to verify that the packaged development code deployed to the at least one second environment system meets version requirements of the at least one second environment system. For example, the at least one second environment system may comprise version '01-01-08' of an iteration candidate and the development environment system may comprise version '01-01-10' of the an iteration candidate. The system performs the rule diagnostic test to identify that the packaged development code has only version '01-01-09' and version '01-01-10' and may repeat the process of packaging and deployment upon determining the failure of the rule diagnostic test.

As shown in block 328, the system performs an integration diagnostic check to verify that one or more connections with a plurality of systems are active. The system may be communicating with one or more systems or applications to performs various functions and the system performs the integration diagnostic test to verify whether the connections are active. For example, the application software may be linked with a database and the system may be connected to the database system. The system performs the integration diagnostic check to verify that the database connection is active. In the case that the database connection or any other connections with the plurality of systems are not active, the application software may not perform as it is expected to. After determining that the one or more connections with the plurality of systems are not active, the system reestablishes the inactive connections and performs a second integration diagnostic check to verify that all the one or more connections are active. The system repeats this step until it determines that all one or more connections are active.

As shown in block 330, the system facilitates implementation of a plurality of tests on the packaged development code deployed to the at least one second environment system. The system facilitates implementation of the regression test, the second unit test, the user acceptance test, and the performance test before deploying the packaged development code to the third environment system. In some embodiments, the system may automatically run scripts associated with the plurality of tests. In alternate embodiments, the system may transfer the packaged development codes to a plurality of users to perform the plurality of tests. In such an embodiment, the plurality of users perform the plurality of tests and notify the system if each of the plurality of tests are successful or unsuccessful. As shown in block 332, the system verifies that the packaged development code has passed the plurality of tests. The process illustrated from block 310 to block 332 is performed for 'n' number of iteration cycles before deploying the packaged development codes to a third environment system, wherein a packaged development code exists for each of the iteration candidates in 'n' iteration cycles associated with a release cycle. The system may re-package the one or more packaged development codes associated with the release cycle and move the repackaged development codes into open release candidates under the release development branch. At the end of the release cycle, the repackaged development codes existing in a release candidate associated with the release cycle are deployed to the third environment system. The system may assign a release candidate version number from the version ranges calculated in block 306 to the release candidates associated with the release cycle. In some embodiments, only one iteration cycle may exist for a release cycle.

As shown in block 334, the system in response to verifying, deploys the packaged development code to the third environment system. The third environment system is the production environment system, wherein the application software is delivered to the plurality of end users of the application software. In some embodiments, wherein any of the plurality of tests fail, the system notifies the users associated with the development of the set of development codes in the packaged development code. The users may resubmit the set of development codes. The system opens a new release candidate to store the set of development codes resubmitted by the users, wherein the new release candidate is assigned a new release candidate version number which is consecutive to a version number of an existing release candidate. In some embodiments, the system identifies a development code of the set of development codes in the packaged development code which resulted in any of the plurality of tests to fail and notifies the user associated with that development code.

As shown in block 336, the system validates the packaged development code in response to deploying the packaged development code to the third environment system. Validation of the packaged development code is to verify that the technical features of the packaged development code when integrated into the production environment system function properly without disrupting other functions or features of the application software. In other words, the system verifies that new changes in the packaged development code when deployed to the production environment system, did not make the application software unstable. As shown in block 338, the system determines if the validation of the packaged development code is successful. As shown in block 340, the system upon determining that the validation of the packaged development code is successful, restarts the application software associated with the packaged development code. Restarting the application software in the production environment system pushes the new changes in the packaged development codes to the plurality of end users of the application software. The plurality of end users may access the application software via an end user computing system, an end user mobile system, and/or the like. In some embodiments, the system upon determining that the validation of the packaged development code is successful, restarts the application software associated with the packaged development code only after determining that the restarting the application software is required. For example, some new changes may be reflected directly without restarting the application software.

As shown in block 342, the system upon determining that the validation of the packaged development code is unsuccessful, rolls back the packaged development code deployed to the third environment system. For example, when the system identifies that the new changes in the packaged development code associated with the deployment version have made the application software unstable, the system rolls back to the most stable deployment version. If the most stable deployment version was '08-11-06' and the recent packaged deployment version is '08-11-07' the system rolls back to version '08-11-06' after determining that the deployment version '08-11-07' has made the application software unstable. In some embodiments, the system automatically notifies the one or more users associated with each of the set of development codes in the packaged development code and may repeat the process flow 300.

FIG. 4 illustrates a general process flow for ruleset versioning and moving the development codes received from the user into iteration candidates and release candidates based on the duration of the iteration cycles and the release cycles. As shown in block 410, the system receives a first development code associated with a first rule-set from a first user, wherein the first user transfers the first development code via a smart tool user interface. In some embodiments, the first user accesses the smart tool user interface and develops the first development code temporarily under the program increment development branch previously created during the application onboarding process. The smart tool user interface is provided by the smart CICD application on the user computer system 20.

Next, as shown in block 420, the system in response to receiving the first development code from the first user, moves the first development code into an open first iteration candidate with a first version number, wherein the first iteration candidate is opened during the application onboarding process as discussed in block 306. The first development code may be associated with a first technical feature of a plurality of technical features associated with a first iteration cycle and a first release cycle of the application software. In some embodiments, the first development code may be associated with more than one technical feature of the plurality of technical features. In some embodiments, the system moves the first development code after receiving a 'move' input from the first user. In alternate embodiments, the system automatically moves the first development code to the first iteration candidate with the first version number.

As shown in block 430, the system receives an input from the first user to lock the first iteration candidate. At this point, the first technical feature may or may not be complete. Locking of the first iteration candidates prevents any other users from moving development codes to the first iteration candidates. In some embodiments, the first user may lock the first iteration candidate after submitting more than one development code associated with more than one technical feature. In some embodiments, the first user may lock the first iteration candidate after submitting a single development code associated with a single technical feature. As shown in block 440, the system in response to receiving the input from the first user, locks the first iteration candidate.

As shown in block 450, the system in response to locking the first iteration candidate, closes the first iteration candidate and opens a second iteration candidate with a second version number, wherein the first version number associated with the first iteration candidate and the second version number associated with the second iteration candidate are consecutive numbers. The system assigns version numbers to the newly opened iteration candidates by identifying the old version number of the previous iteration candidate already existing in the first environment system and assigning a new version number consecutive to the old version number. For example, the system after identifying that the old version number of the existing iteration candidate is '01-01-01,' assigns version number '01-01-02' to the newly opened iteration candidate. The version numbers assigned to the iteration candidates are from the version ranges created by the system during the application onboarding process as discussed in block 306.

Next, as shown in block 460, the system receives a second development code from a second user of the one or more users. In some embodiments, the second development code is associated with a second feature of the plurality of technical features. In some other embodiments, wherein the first technical feature is incomplete at the time the first iteration candidate was locked, the second development code is associated with the first technical feature. In some embodiments, the system receives the second development code from the first user who submitted the first development code. The first user and the second user may be employees of the resource entity. For example, the first user and the second user may be application developers. As shown in block 470, the system moves the second development code received from the second user to the second iteration candidate. The system may follow similar process for assigning version numbers to release candidates which is illustrated in FIG. 6. However, the release candidates comprise one or more iteration candidates associated with an iteration cycle. The system may move iteration candidates into an open release candidate at the end of each iteration cycle. In some embodiments, the system may move the iteration candidates only after receiving an input from a user. The system after moving the iteration candidates into the open release candidate, closes the open release candidate and opens a new release candidate with a new version number, wherein the new version number is consecutive to the previously open release candidate version number.

FIG. 5 presents a block diagram 500 illustrating the process of deployment of an application software in multiple release cycles and iteration cycles. Iteration development 502, as shown in FIG. 5, comprises development of one or more development codes, data instances, framework candidates by plurality of users. Upon development, the plurality of users submit the one or more development codes, data instances, and framework candidates to the system and the system stores the one or more development codes, data instances, and framework candidates in the first environment system i.e., the development environment system. The one or more development codes may be associated with multiple rule-sets. As shown in section 504, the system packages the one or more development codes, data instances, and framework candidates associated with a particular iteration cycle. As shown in section 506, each iteration cycle comprises one or more iteration candidates. For example, iteration 1 comprises candidate 1, candidate 2, candidate 3, candidate 4, and candidate 5 as shown in FIG. 5. Each of the iteration candidates comprise one or more development codes, data instances, and framework candidates associated with one or more rule-sets and may be associated with one or more technical features. All iteration candidates associated with each iteration cycle are then transferred to testing environment system and the acceptance test environment system as shown in section 510. Once all iteration candidates have passed the plurality of tests, the system may create release candidates by packaging all iteration candidates associated with multiple iteration cycles as shown in section 512 and section 514. Release of the application software may be performed in multiple stages i.e., each of the release candidates may be deployed to the production environment system immediately after packaging. In some other embodiments, one or more release candidates may be combined together and deployed at the end of a release cycle to the production environment system as shown in section 516 and section 518.

FIG. 6 illustrates ruleset versioning and creation of iteration candidates and release candidates. As explained in block 306, the system creates program increment development branch 601 in the first environment system (i.e., development environment system) for allowing the plurality of users to temporarily develop one or more development codes before storing the one or more development codes received from the plurality of users in iteration candidates. The system also assigns version range '01-01-99' to the program increment development branch 601, wherein the iteration candidates under the development branch 601 have version numbers from '01-01-01' through '01-01-99'. The system after creating the program increment development branch 601, opens an iteration candidate 1 '01-01-01' 621 with a version number from the previously set version range '01-01-99'. The system may receive a first development code or a change set 1 associated with a first feature from a first user (Developer 1) as shown in block 602 and may move the first development code into the open iteration candidate with version number '01-01-01' 621 as shown in FIG. 6. The first user may submit the first development code via the smart tool user interface. In some embodiments, the system may also receive framework candidates and data instances associated with the first development code from the first user. In some embodiments, the system may receive framework candidates and data instances for the first feature before receiving the first development code.

The system may receive a second development code or change set 2 from a first user or a second user (Developer 2) of the plurality of users as shown in block 603. In some embodiments, the second development code is an incremental change to the first development code. In some embodiments, the second development code is associated with the first feature. In some embodiments, the second development code is associated with a second feature. In the current example, as shown in FIG. 6, the system after receiving the second development code from the first user or the second user, moves the second development code into the open iteration candidate 1 '01-01-02' 621.

The system may then receive an input from the first user or the second user to lock the iteration candidate 1 '01-01-01' 621 comprising the first development code of block 602 and the second development code of block 603 as explained in process flow 400 of FIG. 4. In some embodiments, the first feature may be complete at the time the system receives the input. In alternate embodiments, the first feature may be incomplete at the time the system receives the input. The system, in response to receiving the input from the first user or the second user, locks the iteration candidate 1 '01-01-01' 621 comprising the first development code and the second development code. At this point the system locks the iteration candidate 1 '01-01-01' 621 and closes it. The system in response to closing the iteration candidate '1' 621, opens the iteration candidate 2 '01-01-02' 622 for receiving one or more development codes associated with the first feature and/or other features. In some embodiments, the system may package the iteration candidate 1 '01-01-01' and then deploy the iteration candidate 1 '01-01-01' 621 into the second environment system i.e., testing environment system. In some embodiments, the system automatically deploys the iteration candidate 1 '01-01-01' 621 based on rules created as part of the application onboarding process. In some embodiments, the system deploys the iteration candidate 1 '01-01-01' 621 to the second environment system only after receiving a deploy input from any of the plurality of users. A plurality of tests are performed on the iteration candidate '1' 621 as explained in block 330. In other embodiments, the system may package the iteration candidate 1 '01-01-01' 621 and other iteration candidates associated with an iteration cycle and deploy the iteration candidate 1 '01-01-01' 621 into the second environment system along with other iteration candidates.

The system then receives a third development code or change set 3 associated with the first feature from the first user, a second user, or a third user (Developer 3) of the plurality of users as shown in block 604, and moves and stores the third development code in the iteration candidate 2 '01-01-02' 622'. The system may then receive a second input from any of the plurality of users to close the iteration candidate 2 '01-01-02' 622. Upon receiving the input, the system closes the iteration candidate 2 '01-01-02' 622 and opens iteration candidate 3 '01-01-03' 623. Similarly, the system may receive fourth development code or change set 4 from a fourth user (developer 4) as shown in block 605 and may move the fourth development code to the iteration candidate 3 '01-01-03' 623. The system upon receiving an input from the user, may close the iteration candidate 3 '01-01-03' 623 and open an iteration candidate 4 '01-01-04' 624 to store a fifth development code received from a fifth user (developer 5) as shown in block 606. In some embodiments, the system may package and deploy both the iteration candidate '1' 621 and the iteration candidate '2' 622 into the second environment system together, but in the current example shown in the FIG. 6 the system packages and deploys iteration candidate 1 '01-01-01' 621 through iteration candidate 4 '01-01-04' 624 associated with iteration 1 630. After successful testing the second environment system, the system moves iteration candidates associated with iteration cycle 1 630 (change set from iteration 1 as shown in block 611) into a release candidate 1 '02-01-01' 640 open at the time in a release development branch 610 with version range '02-01-99' created by the system during the application onboarding process as explained in block 306 previously.

Similarly, the system receives multiple development codes (change set 6 of block 607, change set 7 of block 608, change set N of block 609) from the plurality of users (Developer 6 of block 607, Developer 7 of block 608, Developer N of block 609 respectively), moves and stores the multiple development codes in open iteration candidates (iteration candidate 5 '01-01-05' 625 through iteration candidate N '01-01-98' 626) associated with multiple iteration cycles (iteration cycle '2' 631 through iteration 'N' 632). The system then packages and deploys the iteration candidates associated with multiple iteration cycles into second environment system as explained above. After successful testing, the system moves the iteration candidates (e.g., change set from iteration '2' 612 through change set from iteration 'N' 614) associated with multiple iteration cycles (e.g., iteration '2' 631 through iteration 'N' 632) into release candidates (e.g., release candidate 2 '02-01-02' of block 642 release candidate N '02-01-98' of block 627) open at the time. In the case, where any of the tests on development codes stored in the iteration candidates fail during testing in the second environment system, a user of the plurality of users may submit a new development code (Developer X submitting Change Y as shown in block 613). Upon receiving the new development code, the system moves the new development code into an open release candidate 3 '02-01-03' 644. In some embodiments, the system may close an existing release candidate and open a new release candidate to store the new development code. The release candidates associated with multiple release cycles (e.g., Release '1' 650) may be packaged and deployed into third environment system (i.e., production environment system) at the end of each of the multiple release cycles. In the current example, as shown in FIG. 6, it is shown that all release candidates are combined, packaged, and deployed into the third environment system at the end of release cycle 1 650. However, in some embodiments, only release candidate 1 '02-01-01' through release candidate 3 '02-01-03' may be released into the third environment system under release cycle 1 650.

Software integration and deployment of a software application may be performed in multiple release cycles (e.g., release cycle '1' 650, release cycle '2' 652 release cycle 'N' 656). In some embodiments, development of an application software may be performed in one development branch. In some other embodiments, development of an application software may be performed in one or more development branches. There may be multiple software applications which are being deployed and integrated continuously on a daily basis within an entity. Smart CICD tool allows for continuous integration and deployment of multiple software applications simultaneously.

The integration and deployment of software applications will depend on multiple development lifecycles models. Development lifecycles models may include, but not limited to, agile model, waterfall model, spiral method, and/or the like. A plurality of teams within a single resource entity may choose different development life cycles models. The smart CICD tool automatically adapts itself to the type of development lifecycle model selected by each team and supports the process of integration and deployment based on the selected development lifecycle model.

FIG. 7 illustrates of orchestration of the software integration and deployment process in one or more environment systems by the smart tool. FIG. 7 illustrates an example of the software integration and deployment process wherein there is only one iteration cycle in a release candidate and wherein there is only one release candidate in a release cycle. In this figure, the iteration candidates and release candidates are discussed without their version numbers for exemplary purposes only. The iteration candidates and release candidates have version numbers as explained in previous figures. As shown in the figure, between time t0 and time t1 an iteration candidate '1' 710 is developed in the development environment 702. At the beginning of time t1, the iteration candidate '1' 710 may be deployed to the testing environment 704 and between time t1 and time t2 iteration candidate '2' 720 and iteration candidate '3' 730 may be developed in the development environment consecutively. At the beginning of time t2, iteration candidate '2' 720 and iteration candidate '3' 730 are deployed to testing environment 704 and in between time t2 and time t3, iteration candidate '2.1' is developed in the development environment 702.

At the beginning of time t3, the iteration candidate '1' 710, iteration candidate '2' 720 and iteration candidate '3' 730 which are part of one iteration cycle are packaged into a release candidate '1' 770 and are deployed into user acceptance testing environment 706 and iteration candidate '2.1' 740 is deployed into testing environment 704. Iteration candidate '3.1' 750 is developed between time t3 and time t4.

At the beginning of time t4, the release candidate '1' 770, after successful testing is deployed to the production environment 708 as part of a release cycle. In this example, there is only one release candidate in the first release cycle. At the beginning of time t4, the iteration candidate '2.1' 740 is packaged into a release candidate 2.1 780 and deployed into the user acceptance testing environment 706 and iteration candidate '3.1' 750 is deployed to testing environment 704. Iteration candidate '3.2' 760 is developed between time t4 and time t5. As such, the smart CICD orchestrates the deployment of development codes into multiple environment systems simultaneously.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing a smart tool for enterprise-wide software integration and deployment, the system comprising:
    one or more memory devices;
    a smart tool stored in the one or more memory devices, the smart tool comprising one or more modules, wherein the one or more modules include at least a planning module, development module, a build and deploy module, a testing module, and a release module, wherein the one or more modules comprise instructions executable by one or more processing devices operatively coupled to the one or more memory devices, wherein the one or more processing devices are configured for:
    executing instructions in the planning module to:
        identify one or more application prerequisites required for application development of an application; and
        gather the one or more application prerequisites required for the application development of the application;
        notify one or more users that environment set up is complete and the application prerequisites exist in one or more environment systems;
    executing instructions in the development module to:
        receive a set of development codes from one or more users, wherein each of the set of development codes is associated with a rule-set, wherein the rule-set defines a desired feature set for the associated development code;
        store the set of development codes in a first environment system, wherein the first environment system is a development environment system;
        perform a first unit test on each of the set of development codes stored in the first environment system; and
        verify that each of the set of development codes stored in the first environment system meets a set of standards;
    executing instructions in the build and deploy module to:
        create a package comprising at least one version of each of the set of development codes, framework candidates, and data instances stored in the first environment system in multiple iteration candidates for multiple iteration cycles after receiving an input from a first user of the plurality of users, thereby resulting in a packaged development code;
        automatically deploy the packaged development code from the first environment system to at least one second environment system, wherein the second environment system is a testing environment or an acceptance test environment system;
        restart the application associated with the packaged development code;
        perform a plurality of diagnostic checks associated with the packaged development code;

executing instructions in the testing module to:
  perform a plurality of tests on the packaged development code deployed to the at least one second environment system;
executing instructions in the release module to:
  verify that the packaged development code has passed the plurality of tests;
  in response to verifying, deploy the packaged development code to a third environment system, wherein the third environment system is a production environment system from where the application software is delivered to the plurality of end users of the application software.

2. The system of claim 1, wherein the planning module further comprises instructions for:
  initiating framework onboarding process, wherein the framework onboarding process comprises creating the framework candidates; and
  initiating application onboarding process, wherein the application onboarding process comprises calculating and reserving version range for release candidates and iteration candidates, wherein the iteration candidates comprise the set of development codes and the release candidates comprise the packaged development codes associated with the iteration candidates.

3. The system of claim 2, wherein the application onboarding process further comprises:
  creating a program increment development branch and opening a first iteration candidate of the iteration candidates under the program increment development branch, wherein the first iteration is assigned a version number from the version range associated with the iteration candidates; and
  creating a release development branch and opening a first release candidate under the release development branch, wherein the first release candidate is assigned the version number from the version range associated with the release candidates.

4. The system of claim 1, wherein the development module further comprises instructions for:
  in response to verifying each of the set of development codes stored in the first environment system meets a set of standards, determine that a first development code of the set of development codes does not meet the set of standards;
  notify a first user of the one or more users associated with the first development code based on identifying that the first development codes does not meet the set of standards; and
  receive a new development codes from the first user.

5. The system of claim 1, wherein the build and deploy module further comprises instructions for generating one or more notifications in response to deploying the package from the first environment system to at least one second environment system and transmitting the one or more notifications to a plurality of users.

6. The system of claim 1, wherein performing the plurality of tests on the packaged development code comprises:
  performing second unit test on the packaged development code deployed to the at least one second environment system;
  performing a regression test on the packaged development code;
  performing a performance test on the packaged development code; and
  performing a user acceptance test on the packaged development code.

7. The system of claim 1, wherein performing the plurality of diagnostic tests comprises:
  performing a rule diagnostic check to verify that the packaged development code deployed to the at least one second environment system meets version requirements of the at least one second environment system; and
  performing an integration diagnostic check to verify that one or more connections with a plurality of systems are active.

8. The system of claim 1, wherein the build and deploy module further comprises instructions for creating release notes.

9. The system of claim 1, wherein the release module further comprises instructions for:
  validating the application in response to deploying the packaged development code to the third environment system;
  determining that the validation of the application is successful; and
  restarting the application associated with the packaged development code based on determining that the validation of the packaged development code is successful.

10. The system of claim 9, wherein the release module further comprises instructions for:
  determining that the validation of the application is unsuccessful; and
  rolling back the packaged development code deployed to the third environment system.

11. A computer program product for executing a smart tool for enterprise-wide software integration and deployment, wherein the smart tool comprises one or more modules, wherein the one or more modules include at least a planning module, development module, a build and deploy module, a testing module, and a release module, wherein the one or more modules comprise instructions, the computer program product comprising at least one non-transitory computer readable medium comprising computer readable instructions for:
executing instructions in the planning module to:
  identify one or more application prerequisites required for application development of an application; and
  gather the one or more application prerequisites required for the application development of the application;
  notify one or more users that environment set up is complete and the application prerequisites exist in one or more environment systems;
executing instructions in the development module to:
  receive a set of development codes from one or more users, wherein each of the set of development codes is associated with a rule-set, wherein the rule-set defines a desired feature set for the associated development code;
  store the set of development codes in a first environment system, wherein the first environment system is a development environment system;
  perform a first unit test on each of the set of development codes stored in the first environment system; and
  verify that each of the set of development codes stored in the first environment system meets a set of standards;
executing instructions in the build and deploy module to:
  create a package comprising at least one version of each of the set of development codes, framework candidates, and data instances stored in the first environment system in multiple iteration candidates for multiple iteration cycles after receiving an input from a first user of the plurality of users, thereby resulting in a packaged development code;

automatically deploy the packaged development code from the first environment system to at least one second environment system, wherein the second environment system is a testing environment or an acceptance test environment system;

restart the application associated with the packaged development code;

perform a plurality of diagnostic checks associated with the packaged development code;

executing instructions in the testing module to:
perform a plurality of tests on the packaged development code deployed to the at least one second environment system;

executing instructions in the release module to:
verify that the packaged development code has passed the plurality of tests;
in response to verifying, deploy the packaged development code to a third environment system, wherein the third environment system is a production environment system from where the application software is delivered to the plurality of end users of the application software.

12. The computer program product of claim 11, the planning module further comprises instructions for:
initiating framework onboarding process, wherein the framework onboarding process comprises creating the framework candidates; and
initiating application onboarding process, wherein the application onboarding process comprises calculating and reserving version range for release candidates and iteration candidates, wherein the iteration candidates comprise the set of development codes and the release candidates comprise the packaged development codes associated with the iteration candidates.

13. The computer program product of claim 11, wherein performing the plurality of tests on the packaged development code comprises:
performing second unit test on the packaged development code deployed to the at least one second environment system;
performing a regression test on the packaged development code;
performing a performance test on the packaged development code; and
performing a user acceptance test on the packaged development code.

14. The computer program product of claim 11, wherein performing the plurality of diagnostic tests comprises:
performing a rule diagnostic check to verify that the packaged development code deployed to the at least one second environment system meets version requirements of the at least one second environment system; and
performing an integration diagnostic check to verify that one or more connections with a plurality of systems are active.

15. The computer program product of claim 11, wherein the release module further comprises instructions for:
validating the application in response to deploying the packaged development code to the third environment system;
determining that the validation of the application is successful; and
restarting the application associated with the packaged development code based on determining that the validation of the packaged development code is successful.

16. The computer program product of claim 15, wherein the release module further comprises instructions for:
determining that the validation of the application is unsuccessful; and
rolling back the packaged development code deployed to the third environment system.

17. A computer implemented method for executing a smart tool for enterprise-wide software integration and deployment, wherein the smart tool comprises one or more modules, wherein the one or more modules include at least a planning module, development module, a build and deploy module, a testing module, and a release module, wherein the one or more modules comprise instructions, the computer implemented method comprising:
executing instructions in the planning module to:
identify one or more application prerequisites required for application development of an application; and
gather the one or more application prerequisites required for the application development of the application;
notify one or more users that environment set up is complete and the application prerequisites exist in one or more environment systems;
executing instructions in the development module to:
receive a set of development codes from one or more users, wherein each of the set of development codes is associated with a rule-set, wherein the rule-set defines a desired feature set for the associated development code;
store the set of development codes in a first environment system, wherein the first environment system is a development environment system;
perform a first unit test on each of the set of development codes stored in the first environment system; and
verify that each of the set of development codes stored in the first environment system meets a set of standards;
executing instructions in the build and deploy module to:
create a package comprising at least one version of each of the set of development codes, framework candidates, and data instances stored in the first environment system in multiple iteration candidates for multiple iteration cycles after receiving an input from a first user of the plurality of users, thereby resulting in a packaged development code;
automatically deploy the packaged development code from the first environment system to at least one second environment system, wherein the second environment system is a testing environment or an acceptance test environment system;
restart the application associated with the packaged development code;
perform a plurality of diagnostic checks associated with the packaged development code;
executing instructions in the testing module to:
perform a plurality of tests on the packaged development code deployed to the at least one second environment system;
executing instructions in the release module to:
verify that the packaged development code has passed the plurality of tests;
in response to verifying, deploy the packaged development code to a third environment system, wherein the third environment system is a production environment system from where the application software is delivered to the plurality of end users of the application software.

18. The computer implemented method of claim 17, wherein the planning module further comprises instructions for:
- initiating framework onboarding process, wherein the framework onboarding process comprises creating the framework candidates; and
- initiating application onboarding process, wherein the application onboarding process comprises calculating and reserving version range for release candidates and iteration candidates, wherein the iteration candidates comprise the set of development codes and the release candidates comprise the packaged development codes associated with the iteration candidates.

19. The computer implemented method of claim 17, wherein performing the plurality of diagnostic tests comprises:
- performing a rule diagnostic check to verify that the packaged development code deployed to the at least one second environment system meets version requirements of the at least one second environment system; and
- performing an integration diagnostic check to verify that one or more connections with a plurality of systems are active.

20. The computer program product of claim 17, wherein performing the plurality of tests on the packaged development code comprises:
- performing second unit test on the packaged development code deployed to the at least one second environment system;
- performing a regression test on the packaged development code;
- performing a performance test on the packaged development code; and
- performing a user acceptance test on the packaged development code.

* * * * *